United States Patent [19]
Toide et al.

[11] Patent Number: 4,817,072
[45] Date of Patent: Mar. 28, 1989

[54] OPTICAL HEAD UTILIZING DIFFRACTION GRATING

[75] Inventors: Eiichi Toide; Shinsuke Shikama; Mitsushige Kondo, all of Nagaokakyo, Japan

[73] Assignee: Mitsubishi Denki Kabushiki Kaisha, Tokyo, Japan

[21] Appl. No.: 66,009

[22] Filed: Jun. 24, 1987

[30] Foreign Application Priority Data

Jul. 1, 1986 [JP] Japan ............... 61-154679
Jul. 11, 1986 [JP] Japan ............... 61-163071
Oct. 31, 1986 [JP] Japan ............... 61-259845

[51] Int. Cl.$^4$ ............................... G11B 7/00
[52] U.S. Cl. ............................ 369/44; 369/45; 369/46; 369/109; 250/201
[58] Field of Search ............... 369/43–47, 369/109; 358/342; 250/201 DF

[56] References Cited

U.S. PATENT DOCUMENTS

4,358,200 11/1982 Heemskerk et al.
4,462,095 7/1984 Di Chen ..................... 369/44
4,665,310 5/1987 Heemskerk .................. 250/201

FOREIGN PATENT DOCUMENTS

61-73246 4/1986 Japan.
61-122944 6/1986 Japan.
61-122945 6/1986 Japan.
61-151844 7/1986 Japan.

Primary Examiner—Robert L. Richardson
Attorney, Agent, or Firm—Oblon, Fisher, Spivak, McClelland & Maier

[57] ABSTRACT

In an optical type head device comprising a light source for emitting a light beam, a beam splitter, a condensor lens and a light detector for receiving said light beam for photoelectric conversion wherein a diffraction grating is provided to separate the light beam into a plurality of subbeams consisting of a zero-order subbeam and other subbeams so that a focussing error of the spot of the zero-order subbeam on an optical type data storing medium is detected by the fact that the light spot of the zero-order subbeam is deformed on the light detector, and a positional error of the spot of the zero-order subbeam with respect to a data track on the optical type data storing medium is detected depending on the position of the spots of the other subbeams.

10 Claims, 4 Drawing Sheets (a)

(b)

(c)

(a)

(b)

OPTICAL HEAD UTILIZING DIFFRACTION GRATING

BACKGROUND OF THE INVENTION

1. FIELD OF THE INVENTION

The present invention relates to an optical type head device used for recording data on a data storing medium and reproducing the data. More particularly, it relates to three beam type optical head device wherein an astigmatic method is applied to a focussing servo system and a twin beam method is applied to a tracking servo system.

2. DISCUSSION OF BACKGROUND

FIG. 9 shows the construction of a conventional optical type head device. In FIG. 9, a reference numeral 1 designates a semiconductor laser (hereinbelow, referred to as an LD) as a light source for emitting a light beam 2 such as a laser beam, a numeral 4 designates a flat-shaped beam splitter which reflects the light beam by its first surface 4a so that the reflected light beam is entered in a condensor lens 5, a numeral 6 designates an optical type data storing medium (hereinbelow, referred to as an optical disc) placed near the focal point of the light beam converged by the condensor lens 5, a numeral 7 designates a plurality of pits as data recorded in or reproduced from the optical disc 6 and a numeral 8 designates data tracks consisting of a train the pits. A light detector 10 is placed in the vicinity of the LD in such a manner that it receives a reflected light beam which is first reflected by the optical disc 6; is passed through the condensor lens 6 and the first surface 4a of the beam splitter 4; is reflected by a second surface 4b of the beam splitter 4, and is passed though the first surface 4a.

The operation of the conventional optical type head device having the above-mentioned construction will be described.

The light beam 2 emitted from the LD 1 is reflected by the first surface 4a of the beam splitter 4, and then, is focused on the data track of the optical disc by means of the condensor lens 5. The light beam focused on the optical disc 6 is reflected by the data track surface and entered in the beam splitter through the condensor lens 5. The light beam is passed through the first surface 4a of the beam splitter 4 and is reflected by the second surface 4b and is passed again through the first surface 4a of the beam splitter 4.

Accordingly, the light beam passing through the beam splitter 4 is subjected to astigmatism which is well known; namely, a meridional light beam and a sagittal light beam respectively form focul lines. The reflected light beam enters in the light detector 10.

When the first and second surfaces 4a, 4b of the beam splitter 4 is in parallel with each other, wherein the thickness of the beam splitter 4 is t (the index of reflaction is n and the angle of incidence to the first surface 4a is $\theta$(rad), an astigmatic focal distance $\Delta$ is expressed by the following equation:

$$\Delta = 2 \times t \times \theta^2 \times \frac{(n^2 - 1)}{n^3} \quad (1)$$

The reflected light beam 2' with the astigmatism is passed in parallel to the light beam 2 from the LD 1, but is passed reversely, wherein the primary light beam indicated by one-dotted chain line enters in the light detector 10 with a deflection of $2t \cdot \tan\theta' \cdot \cos\theta$. In the above-mentioned formula, $\theta'$ satisfies a relation of $n \sin \theta' = \sin \theta$.

The conventional optical type head device has the light detector which is placed in the same direction as the light source but slightly deflected from the same with respect to the beam splitter. Such arrangement provides various advantages. For instance, since the light detector is placed in the vicinity of the light source, a thin and small-sized optical system can be provided.

In the optical type head device, the light detector 10 is arranged in such a manner that the light beam reflected from the optical disc forms a circle of least confusion 11 as shown in FIG. 9b when a light spot on the optical disc 6 is focused.

The light detector 10 is divided into four light sensing sections 10a, 10b, 10c and 10d each of which detects the intensity of the light beam.

It is known that a light spot 12 on the light detector 10 is a distorted or becomes flat when there is a focussing error. Such focussing error can be detected by processing outputs from two groups of sensing sections which are diagonally opposing among the four-devided sensing sections in the light detector 10. Namely, the sensing sections 10a, 10c are diagonally opposing and the sensing sections 10b, 10d are also diagonally opposing. The output obtained by subtracting the outputs of the both diagonally opposing sections i.e., $\{(10a)+(10c)\}-\{(10b)+(10d)\}$, is processed by an operating unit, and a resulted signal is outputted as a focussing error signal, whereby the focussing error of the light spot on the optical disc is corrected by a focus actuator (not shown).

The above-mentioned method of detection of the focussing error is called an astigmatic method. In the astigmatic method, the circle of least confusion 11 is substantially circular as shown in FIG. 9b when the light spot on the optical disc is in focused condition. However, when the focussing error takes place due to fluctuation of the distance between the light source 1 and the optical disc 6, the light spot on the light detector 10 deforms into an oval form flattned in the longitudinal or transverse direction as indicated by broken lines. Accordingly, by detecting electrically the light spot deformed in the oval form, deviation in position of the focal point can be detected.

On the other hand, operation of tracking is always conducted to correctly apply the light spot of the light beam onto the data track of the optical disc 6. For instance, a tracking error signal may be obtained by the difference of outputs between a group of the sensing sections 10a, 10b and a group of sensing sections 10c, 10d which are symmetric with respect to a dividing line on the light detector 10 as shown in FIG. 9b. The dividing line 7' can be a symmetric line on the distribution of the intensity of a diffracted image given by the data track 8 by inclining the direction of the data track 8 by 45° with respect to the path x of the light beam 2 emitted from the LD, and by detecting change of the light quantity in the vertical direction of the dividing line 7', error in poition of the light spot on the optical disc can be detected. Thus, the difference of the outputs between the group of the sensing sections 10a, 10b and the group of the sensing sections 10c, 10d ($\{(10a)+(10b)\}-\{(10c)+(10d)\}$) is processed based on the output from the light detector 10, and the calculated value is outputted as the tracking error signal, whereby the tracking actuator is controlled by the tracking error signal and the light spot is corrected so that it is correctly located at the center of the data track 8.

As described above, since the conventional optical type head device employs the tracking system as mentioned above, there is a problem that when inclination of the optical disc 6 itself takes place, a correct tracking operation of the light spot can not be attained. That is, in FIG. 9, when the light spot is correctly formed on the data track 8 of the optical disc 6, distribution of the diffracted light beam reflected by the pits 7 is symmetric with respect to the center line, and therefore, the light spot on the light detector 10 is symmetric with respect to the dividing line 7'. The outputs from the sensing sections have a relation of $(10a+10b)=(10c+10d)$.

When the light spot on the optical disc 6 is slightly deviated from the data track 8 in its longitudinal direction, the distribution of the intensity of the light beam reflected by the pits 7 becomes asymmetric with respect to the center line of the data track. In this case, the outputs from the light detector are in the relation of either $(10a+10b)>(10c+10d)$, or $(10a+10b)<(10c+10d)$. Accordingly, by determining the differential output from the light detector 10 as the tracking error signal, deviation of the light spot 9 with respect to the data track 8 can be detected. Namely, to obtain correct tracking operation, it is necessary that the intensity distribution of the diffracted light beam reflected from the beam splitter is symmetric with respect to the center line of the data track when the light spot is correctly converged on the data track.

However, it is well known that a light beam is subjected to coma when the optical disc 6 is inclined. The coma disturbs symmetry in the distribution of the reflected light beam. Even though the light beam with the coma, which causes asymmetric distribution, is correctly converged on the data track, the reflected light beam can not provide symmetry with respect to the center line of the data track, whereby correct tracking can not be obtained by the tracking error signal.

When the optical disc 6 is inclined, the primary light beam in the reflected light beam, indicated by one-dotted chain line in FIG. 9a, is also inclined with the result that the light spot 11 on the light detector 10 is also deformed. Accordingly, the deformation of the light spot does not provide a correct tracking error signal.

SUMMARY OF THE INVENTION

It is an object of the present invention to provide an optical type head device which permits easy detection of light spot deviated from a data track in its longitudinal direction even when there takes place inclination of an optical disc.

The present invention is to provide an optical type head device comprising a light source for emitting a light beam, a beam splitter having a first surface which reflects the light beam emitted from the light source to direct it toward the data storing surface of an optical type data storing medium and a second surface which reflects the light beam reflected by the data storing surface, a condensor lens means for converging the light beam reflected by the beam splitter on the data storing surface as light spots, and a light detector for receiving for photoelectric conversion the light beam reflected by the second surface and passing through the first surface, characterized in that a diffraction grating is provided to separate the light beam emitted from the light source into a plurality of diffracted subbeams consisting of a zero-order subbeam so that a focussing error of the spot of the zero-order subbeam on the optical type data storing medium is detected by the fact that light spot of the zero-order subbeam is deformed on said light detector, and a positional error of the spot of the zero-order subbeam with respect to a data track on the optical type data storing medium is detected by the position of the spots of the subbeams other than the zero-order subbeam.

The present invention further provides an optical type head device comprising a light source for emitting a light beam, a flat-shaped beam splitter having a first surface as a front surface which reflects the light beam emitted from the light source and a second surface as a rear surface which reflects the light beam returning along a path parallel to the path of the light beam reflected by the first surface, and a ligtht detector placed in the vicinity of the light source to receive the light beam reflected by the second surface of the beam splitter, characterized in that a diffraction grating is formed on the first surface of the beam splitter, and the light source, the beam splitter and the light detector are mounted on a single block which is hermetically sealed in a package.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 shows a conventional optical type head device, wherein

DETAILED DESCRIPTION OF PREFERRED EMBODIMENTS

FIG. 1a shows a general construction of a first embodiment of the optical type head device according to the present invention;

FIG. 1b is a diagram showing an embodiment of the light detector used for the head device shown in FIG. 1a, and FIG. 1c schematically shows light spots on an optical disc.

Figure 1:
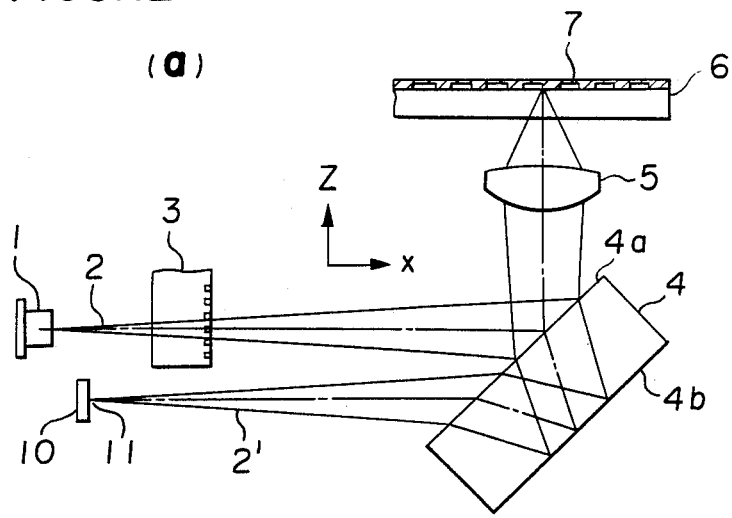
FIG. 1a is a diagram showing an embodiment of the optical type head device according to the present invention.
FIG. 1b is a diagram showing an embodiment of the light detector used for the present invention.
FIG. 1c is a diagram showing a relation of light spots to a data track in the optical type head device of the present invention.
Figure 1:
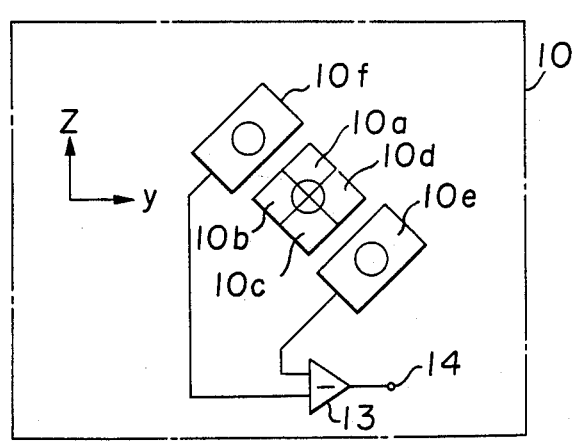
Figure 1:
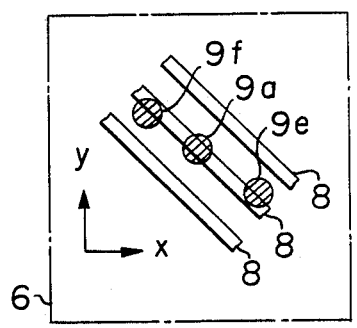
Figure 9A:
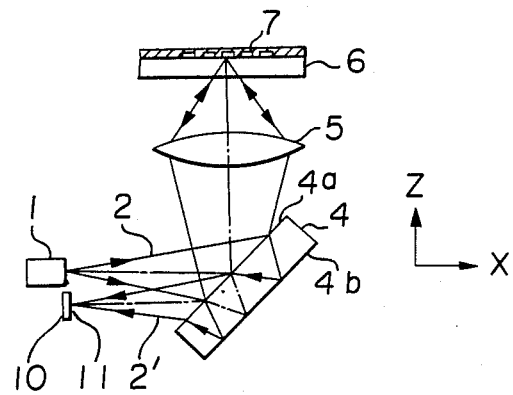
FIG. 9a is a diagram showing the entire structure of the device.
Figure 9B:
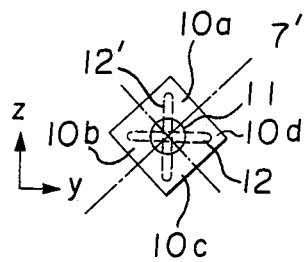
FIG. 9b is a diagram showing a light detector.
Figure 9C:
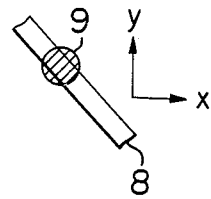
FIG. 9c is a diagram showing a relation of a light spot to a data track on an optical disc.

The construction of the optical type head device shown in FIG. 1 is similar to that of the conventional device shown in FIG. 9 provided that a diffraction grating 3 is placed in a path of a light beam 2 emitted from an LD 1. Therefore, description on the elements indicated by the same reference numerals, as in FIG. 9 is omitted.

The operation of the optical type head device of the first embodiment will be described.

The light beam 2 emitted from the LD 1 is subjected to diffraction by the diffraction grating 3 to be separated into a plurality of subbeams and they are converged on the data bearing surface of the optical disc 6 as three light spots 9a, 9e, 9f as indicated by hatched circles after they have been reflected by the first surface 4a of the beam splitter 4.

The three light spots 9a, 9e and 9f are so arranged that a line connecting each center of the light spots is slightly inclined to the direction of the locus of a data track 8, whereby a focussing error is detected by the light spot 9a and a positional error in the longitudinal direction of the data track is detected by the light spots 9e, 9f.

The subbeams converged on the optical disc 6 are reflected by the data track 8 to be entered in the beam splitter 4 through the condensor lens 5. The subbeams are reflected by the second surface 4b of the beam splitter and enter into the light detector 10. In more detail, the subbeams reflected by the optical disc 6 are passed through the first surface 4a and are reflected by the second surface 4b so that the direction of the radiation is changed. The reflected subbeams are again passed through the first surface 4a as reflected light beams 2' which are in parallel with the light beam 2 emitted from the LD 1 and are spaced with a predetermined distance to the light beam 2, and are received by the light detector 10. The reflected light beams 2' is subjected to astigmatism while they are passed through and are reflected by the beam splitter.

The light detector 10 is placed in such a manner that when the light spots are focussed on the optical disc, the reflected beam of the zero-order diffraction subbeam as the primary light beam (corresponding to the light spot 9a) forms a circle of least confusion. As shown in FIG. 1b, the light detector 10 has six sensing sections which detect three subbeams. Of the three subbeams, the central subbeam (the zero-order subbeam) is received by four-divided sensing sections 10a, 10b, 10c, 10d. Other subbeams (the positive and negative first-order subbeams) at both sides of the zero-order subbeam are independently received by the respectively sensing sections 10e, 10f.

Outputs from the light sensing sections 10e, 10f are subjected to differential calculation by subractor 13, for instance, and thus obtained electric signal is outputted as a tracking error signal, whereby the positional error of the central light spot 9a with respect to the longitudinal direction of the data track 8 can be detected. A tracking actuator (not shown) is controlled and driven by the tracking error signal so that the position of the central light spot 9a is correctly brought into the center of the data track 8.

Thus, according to the twin beam type tracking servo system in which the positive and negative first-order subbeams are utilized, positional error of the central beam in the longitudinal direction of the data track is detected by the two subbeams, and therefore, a stable tracking servo operation can be carried out without adverse effect of the coma which may be resulted by inclination of the optical disc. Further, in this system, the tracking servo is separately carried out from the focussing servo, whereby there is little interference between the both servo systems.

Figure 2:
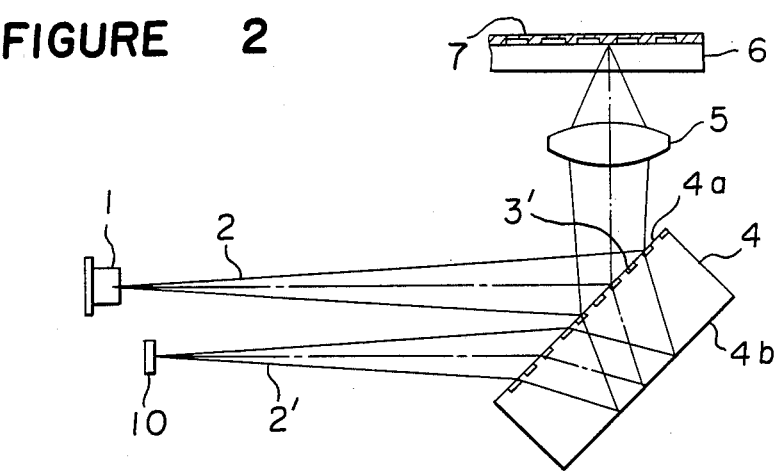
FIG. 2 is a diagram showing a second embodiment of the present invention.

FIG. 2 shows a second embodiment of the optical type head device according to the present invention.

The second embodiment is featurized by the fact that the diffraction grating for forming a plurality of subbeams is not independently provided, but is formed integrally on the first surface of the beam splitter 4. In more detail, a diffraction grating 30 is formed on the first surface 4a of the beam splitter 4 which is inclined 45° with respect to the light beam 2 emitted from the LD 1. Recording and reproducing of the data on the optical disc 6 are carried out in the same manner as the first embodiment while subjecting to the focussing servo and the tracking servo.

According to the second embodiment in which the diffraction grating is formed integrally with the beam splitter having a flat plate-like shape, the number of parts used for the optical system is reduced, and cost for manufacturing the optical type head device is also reduced.

Figure 3:
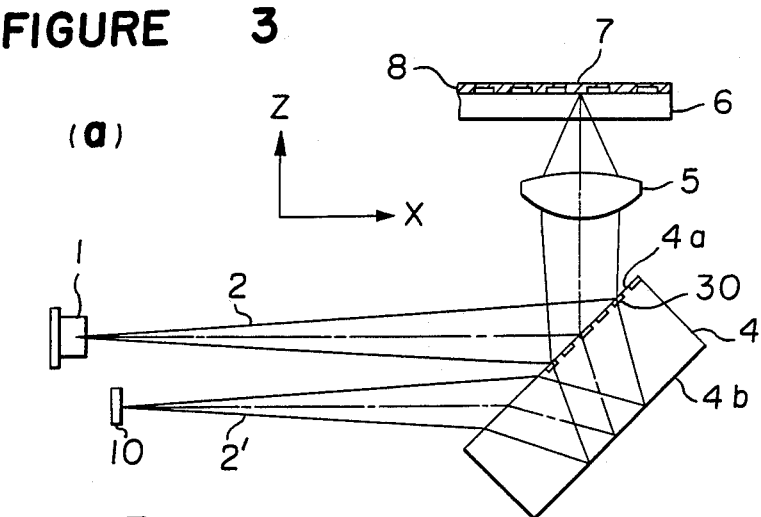
FIG. 3a is a diagram showing a third embodiment of the optical type head device according to the present invention.
FIG. 3b is a diagram of a beam splitter used for the present invention in which first and second apertures for passing light beams are formed in the first surface of the beam splitter.
Figure 3:
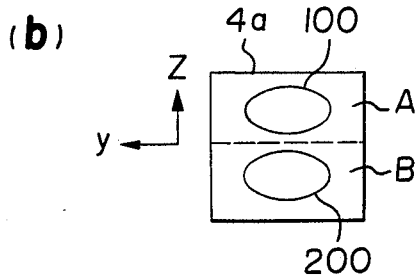

The third embodiment of the optical type head device according to the present invention will be described with reference to FIG. 3. In FIG. 3, the same reference nemerals as in FIGS. 1 and 2 designate the same or corresponding parts, and therefore, description of these parts is omitted.

The feature of the third embodiment is that the beam splitter of the optical type head device is adapted to eliminate mutual interference by the zero-order and positive and negative first-order diffraction subbeams which are used for correction of the focussing error and the tracking error. For this purpose, the first surface 4a of the beam splitter 4 through which the light beam is passed through twice is separated into two regions, and the diffraction grating 30 is formed only on one region for reflecting the light beam emitted form the LD.

The light beam 4 is formed to satisfy the following formula:

$$t > \frac{l \cdot NA}{\tan(\theta') \cdot (\cos\theta + \sin\theta \cdot NA)} \quad (2)$$

where t is a thickness of the beam splitter, NA is the number of aperture of the light beam emitted from the light source, $\theta$(rad) is an angle of incidence of the light beam to the first surface, $\theta'$(rad) is an index of reflaction, and   is the distance between the light source and the first surface along the path of the primary light beam. By fabricating the beam splitter to satisfy the above-mentioned formula, an aperture 100 for receiving the light beam and an aperture 200 for passing through the light beam are separated into independent regions A and B. And the diffraction grating 30 is formed only in the region A by which the light beam emitted from the LD is diffracted into a plurality of subbeams.

The third embodiment of the present invention functions as follows. The light beam 2 emitted from the LD 1 is subjected to diffraction by the diffraction grating 30 which is partially formed on the first surface 4a of the beam splitter 4, and the diffracted subbeams are reflected by the first surface 4a. The subbeams are passed through the condensor lens 5 so that three light spots are converged on one of the data track of the optical disc 6. The subbeams on the optical disc 6 are reflected by the data track 8 and are again passed through the condensor lens 5 and the diffraction grating 30 in the region A of the first surface 4a. The light beams are then reflected by the second surface 4b and passed through the region B in the first surface 4a. Thus, the subbeams are received by the light detector without passing through the position of the diffraction grating 30. Thus, generation of unnecessary diffraction beams and mutual interference by the diffraction beams can be reduced by minimizing the number of transition of the light beams through the diffraction grating to thereby detect correctly various errors such as the positional error in the longitudinal direction of the data track.

Figure 4:
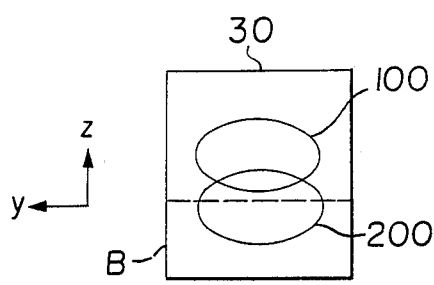
FIG. 4 is a diagram showing a third embodiment of the beam splitter shown in FIG. 3b.

In the third embodiment shown in FIG. 3, explanation has been made as to the case that first aperture for receiving the light beam emitted from the light source is completely separated from the second aperture for passing through the reflected subbeams. However, the beam splitter may be modified as shown in FIG. 4. Namely, the two apertures are not completely separated, and the diffraction grating is formed only in the region A so that only a part of the reflected light beams are permitted to pass through the diffraction grating.

In the third embodiment of the optical type head device, the light beams diffracted by the optical disc are not passed through the diffraction grating when they go out the beam splitter after having been reflected by the second surface. Accordingly, the light beams reflected by the second surface and transmitted to the light detector do not suffer adverse effect by the diffraction grating.

Further, in accordance with the third embodiment, an optical type head device of a small-sized and light weight can be obtained without increasing the number of elements used for the optical system.

In the first to third embodiments, description has been made as to the case that the direction of the data track on the optical disc is inclined 45° with respect to the light beam emitted from the LD 1 in an x-y plane, and the light splitter 4 is inclined 45° with respect to the direction of the light beam in the x-y plane. However, the present invention is applicable to the data track and the beam splitter being inclined at an angle other than 45°. For the flat-shaped splitter having the first and second surfaces which are parallel with each other, a wedge-shaped beam splitter may be used to increase effect of the astigmatism to the light beams reflected from the optical disc. In this case, the thickness of the light splitter can be thin.

FIGS. 5 to 8 show embodiments of the optical type head device of the present invention in which various structural elements of the optical system are precisely arranged in a compact form.

In the embodiments shown in FIGS. 1 to 3, a light emitting point of the LD 1 and the circle of least confusion 11 formed of the light detector are mutually apart from 1 mm or smaller in the direction of the optical axis and in the direction perpendicular thereto. By utilizing the above-mentioned positional relationship, the LD tip and the light detector are placed on the same substrate so that the light source, the beam splitter and the light detector are included in a single package. Accordingly, the embodiments of the optical type head device has a precise relative position for various elements with a high accuracy.

In FIGS. 5 to 8, the same reference numerals as in FIGS. 1 to 4 designate the same or corresponding parts.

Figure 5:
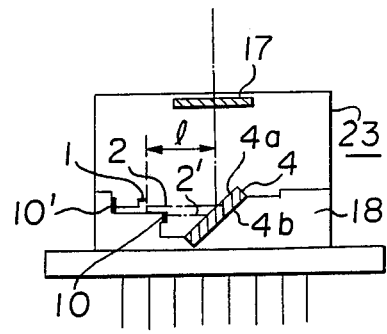
FIG. 5 is a diagram showing a fourth embodiment of the optical type head device according to the present invention.

FIG. 5 shows an embodiment of the optical type head device in which important elements are sealed in a single package and relative positions of the elements are determined precisely.

In this embodiment, the relative positions of the LD 1 and the light detector 10 to those of the other important elements of the optical system are adjustable in the range of $\pm 25$ μm in the direction of the optical axis and $\pm 5$ μm in the direction perpendicular to the optical axis. The shape of the package which determines the relative positions of the important optical elements is preferably in a cylindrical form in which the outer diameter is at least 10 mm. Although the cylindrical package having a smaller outer diameter is difficult to be formed theoretically and practically, it is possible to fabricate the optical type head unit 23 having a cylindrical package of a diameter of 5 mm.

The LD 1, the beam splitter 4 and the light detector 10 are mounted on a block 18 at precise positions. The block 18 functions to discharge heat produced in the LD.

In this embodiment, the LD 1 may be a semiconductor chip having a P-N junction. A reference numeral 10' designates a second light detector for monitoring the output of the LD and numeral 17 designates a window for permitting the laser beam to pass through.

In the optical type head unit 23, the distance between the LD 1 and the beam splitter 4 is determined to be extremely short. Accordingly, it is sufficient that the first and second surfaces of the beam splitter 4 are formed with parallelism of about 3' (three sixtieth degree) when, for instance, the distance    is determined to be 3 mm. In this case, it is unnecessary to adjust the position of light detector 10. This embodiment provides further advantage that an effective surface area of the beam splitter 4 can be small and therefore, the surface accuracy of the beam splitter which is an important element, can be easily obtained. Accordingly, the beam splitter can be manufactured at a lower cost. The position of the structural elements can be automatically determined when the distance    , the thickness t of the beam splitter and an angle of inclination $\theta$ of the beam splitter are respectively determined.

Figure 6A:
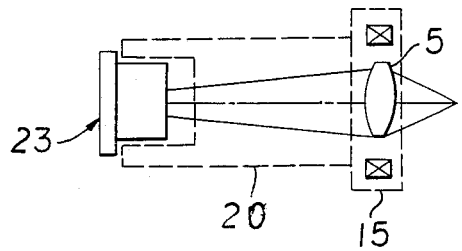
FIGS. 6A, 6B and 6C are respectively diagrams showing separate embodiments of the present invention.
Figure 6B:
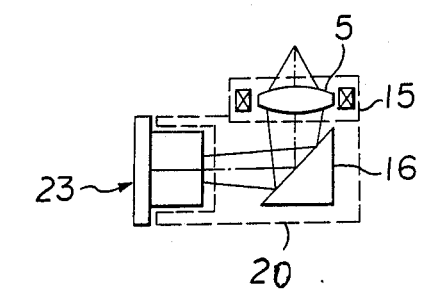
Figure 6C:
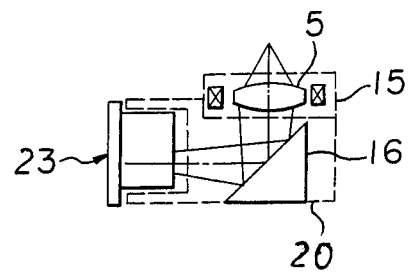
Figure 7:
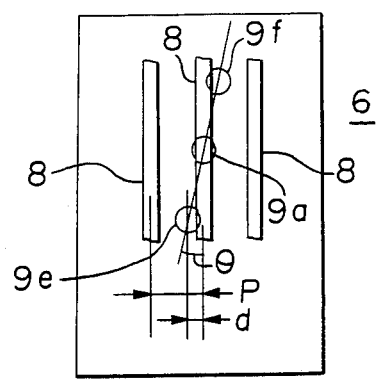
FIG. 7 is a diagram showing adjustment of light spots in the fourth embodiment of the present invention.

FIGS. 6A, 6B and 6C show several embodiments of the optical type head device having the optical type head unit 23. In the Figures, a reference numeral 20 designates an optical housing and a numeral 15 designates an actuator for controlling the condensor lens 5 for feed-back driving of it to thereby perform focussing and tracking operations.

The operation of this embodiment is basically the same as that of the conventional optical type head device except that data recorded on the optical disc 6 and data concerning the position of the light spots on the optical disc can be obtained from the optical type head unit 23 in association with the actuator 15 for operating the condensor lens 5. This embodiment has further advantage that it is unnecessary to adjust the elements such as light detector when assembled.

Various types of optical type head device can be fabricated by using the optical type head unit 23.

FIG. 6B shows an example of the optical type head device. A reflection mirror 16 is provided to deflect the path of the light beam toward the lens 5, whereby a space for passing the light beam, which usually requires much volume, can be reduced, and a thin type head device can be easily provided.

Instead of the embodiments shown in FIGS. 6A, 6B in which the central axial line of the package is in agreement with the optical axial line of the light beam emitted from the LD, there may be used an optical type head device in which the optical axial line of the emitted light beam is not in agreemnt with the central axial line of the packages as shown in FIG. 6C. This embodiment provides a thin optical type head device.

In the above-mentioned embodiments shown in FIGS. 5 and 6, a diffraction grating is formed on the first surface 4a of the beam splitter 4 in the optical type head unit 23 to carried out tracking operation according to the twin spot method. In the twin spot method, a rotation-adjustment of the diffraction grating may be necessary in such a manner that the focussing points of the three beams on the optical disc 6 are slightly deviated to the data track 8 when the zero-order subbeam converging point 9a is considered as standard. Namely, when an angle $\theta$ is adjusted to be d=P/4, the greatest tracking signal can be obtained wherein 9e, 9f are respectively positive and negative first-order subbeams, P is a pitch of data track and d is the distance between the positive and negative first-order subbeams and zero-order subbeam. In this case, it is preferable that the axial center line of the package of the optical head unit 23 is in agreement with the optical axis of the light beam emitted from the LD. The agreement of the optical axis can be obtained by rotating the entirety of the optical type head unit 23 with respect to the optical housing 20 at their fitting part. Rotation of the optical head unit 23 does not deflect the optical axis and therefore an excellent light focussing characteristic can be maintained in connection with the light converging optical element 5 such as the lens. In this case, it is unnecessary to adjust the light detector because there is no adverse affect to the focussing signal.

The light detector 10 has at least six light sensing sections in the same manner as the first to third embodiments.

It is possible to use a rectangular box-shaped package for the optical type head unit instead of the cylindrical unit 23.

The optical type head unit 23 is applicable to various uses such as a position sensor as a light emitting-receiving element.

Figure 8:
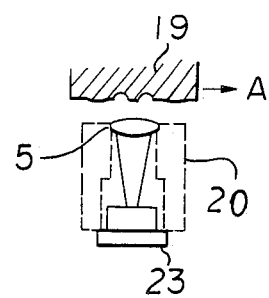
FIG. 8 is a diagram showing a modified embodiment of the optical type head device shown in FIG. 5.

FIG. 8 shows an example of the optical type head unit 23 used as a position sensor. In FIG. 8, a reference numeral 19 designates an object. The optical type head unit 23 and the lens 5 are fixed to the optical housing 20. The object 19 is placed near the focussing point. When the light beam is correctly focused on the surface of the object, no focussing error signal is generated. However, when the object 19 is moved in the direction A, a focussing error signal is generated due to an even surface of the object. Thus, the shape of the surface can be examined by inputting data on the quantity of projections and recesses and variation of the focussing error signal. Thus, by suitably selecting the number of aperture NA of the light beam converging element such as the lens, the optical type head unit can function as a sensor for sensing positions of the object from the optical type head device with a high measuring accuracy and in a broad measuring range.

Thus, in accordance with the above-mentioned embodiment, the LD the beam splitter and the light detector are contained in a single package. Accordingly, a reliable optical type head device can be provided by using an inexpensive beam splitter and without necessitating adjustment of the sensing sections of the light detector. Further, the optical type head device can be small-sized and thin by utilizing the optical head unit as a part of the head device.

Obviously, numerous modifications and variations of the present invention are possible in light of the above teachings. It is therefore to be understood that within the scope of the appended claims, the invention may be practiced otherwise than as specifically described herein.

What is claimed is:

1. An optical type head device comprising:
   a light source for emitting a light beam,
   a beam splitter having a first surface which reflects the light beam emitted from said light source to direct it toward the data storing surface of an optical type data storing medium and a second surface which reflects the light beam reflected by said data storing surface,
   a condensor lens means for converging the light beam reflected by said beam splitter on said data storing surface as light spots, and
   a light detector for receiving for photoelectric conversion said light beam reflected by said second surface and passing through said first surface, characterized in that a diffraction grating is provided to separate said light beam emitted from said light source into a plurality of diffracted subbeams consisting of a zero-order subbeam so that a focussing error of the spot of said zero-order subbeam on said optical type data storing medium is detected by the fact that light spot of the zero-order subbeam is deformed on said light detector, and a positional error of the spot of said zero-order subbeam with respect to a data track on said optical type data storing medium is detected by the position of the spots of said subbeams other than the zero-order subbeam.

2. The optical type head device according to claim 1, wherein said diffraction grating is formed on said first surface of the beam splitter.

3. The optical type head device according to claim 2, wherein said diffraction grating is formed on a part of said first surface so that said diffraction grating acts only on the light beam emitted from said light source.

4. The optical type head device according to claim 3, wherein a first aperture for receiving the light beam emitted from said light source is formed in said first surface, which is independent of a second aperture for passing therethrough the light beam which is reflected by said data storing surface and said second surface.

5. The optical type head device according to claim 3 or 4, wherein said beam splitter is so formed as to satisfy the following formula:

$$t > \frac{l \cdot NA}{\tan(\theta') \cdot (\cos\theta + \sin\theta \cdot NA)}$$

where t is a thickness of the beam splitter, NA is the number of aperture of the light beam emitting from the light source, $\theta$(rad) is an angle of incidence of the light beam to the first surface, $\theta'$(rad) is an index of refraction and     is the distance of the first surface along the path of the primary light beam.

6. The optical type head device according to claim 1 or 2 wherein said first and second surfaces of said beam splitter are parallel with each other.

7. The optical type head device according to claim 1 or 2, wherein said first and second surfaces of said beam splitter constitute a wedged beam splitter.

8. An optical type head device comprising:
a light source for emitting a light beam,
a flat-shaped beam splitter having a first surface as a front surface which reflects the light beam emitted from said light source and a second surface as a rear surface which reflects the light beam returning along a path parallel to the path of said light beam reflected by said first surface, and
a light detector placed in the vicinity of said light source to receive the light beam reflected by said second surface of the beam splitter, characterized in that a diffraction grating is formed on said beam splitter, and said light source, said beam splitter and said light detector are mounted on a single block which is hermetically sealed in a package.

9. The optical type head device according to claim 8, wherein said light detector has at least one four-divided light sensing sections and means for outputting data concerning the spot of said light beam.

10. The optical type head device according to claim 8, wherein said package has a cylindrical shape and the center line of the cylindrical package is in agreement with the optical axis of said light beam.

* * * * *